(12) United States Patent
Lee et al.

(10) Patent No.: US 10,423,263 B2
(45) Date of Patent: Sep. 24, 2019

(54) PORTABLE ELECTRONIC DEVICE HAVING HINGE MEMBER AND CONNECTING ASSEMBLY

(71) Applicant: Quanta Computer Inc., Taoyuan (TW)

(72) Inventors: Kun-Ho Lee, Taoyuan (TW); Chih-Min Chan, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 15/962,447

(22) Filed: Apr. 25, 2018

(65) Prior Publication Data

US 2019/0129546 A1    May 2, 2019

(30) Foreign Application Priority Data

Oct. 26, 2017    (TW) ............................... 106136886 A

(51) Int. Cl.
*G06F 3/00* (2006.01)
*G06F 3/041* (2006.01)
*G06F 1/16* (2006.01)

(52) U.S. Cl.
CPC .......... *G06F 3/0412* (2013.01); *G06F 1/1643* (2013.01); *G06F 1/1681* (2013.01)

(58) Field of Classification Search
CPC .................................................. G06F 1/1681
See application file for complete search history.

(56) References Cited

U.S. PATENT DOCUMENTS 9,239,592 B1 *  1/2016  Liu ....................... G06F 1/1681
9,840,861 B1 * 12/2017  Maatta ................. E05D 11/105
2003/0231464 A1 * 12/2003  Weng .................... G06F 1/1632
                                                    361/679.41
2010/0103603 A1 *  4/2010  Wu ....................... G06F 1/1616
                                                    361/679.05
2015/0098182 A1 *  4/2015  Liu ....................... G06F 1/1681
                                                    361/679.55
2015/0277507 A1 * 10/2015  Wu ....................... G06F 1/1681
                                                    361/679.55
2017/0371379 A1 * 12/2017  Liang ...................... F16C 11/04
2018/0292863 A1 * 10/2018  Escamilla ............. G06F 1/1641

FOREIGN PATENT DOCUMENTS

TW    201519745 A    5/2015
TW    I590031 A    12/2017

OTHER PUBLICATIONS

Chinese language office action dated Oct. 16, 2018, issued in application No. TW 106136886.

* cited by examiner

*Primary Examiner* — Binh B Tran
*Assistant Examiner* — Douglas R Burtner
(74) *Attorney, Agent, or Firm* — McClure, Qualey & Rodack, LLP

(57) ABSTRACT

A portable electronic device is provided. The portable electronic device includes a display unit, an input unit and a hinge member. The hinge member is detachably connected to the display unit and pivotally connected to the input unit, and the hinge member and the display unit are rotatable relative to the input unit around a rotary axis. The display unit has at least a slot and the hinge member has at least a guide pin corresponding to the slot. The guide pin has a first slope structure and a vertical surface structure. The first slope structure and the vertical surface structure are arranged in a direction parallel to the rotary axis.

8 Claims, 5 Drawing Sheets

PORTABLE ELECTRONIC DEVICE HAVING HINGE MEMBER AND CONNECTING ASSEMBLY

CROSS REFERENCE TO RELATED APPLICATIONS

This application claims the benefit of Taiwan Patent Application No. 106136886, filed on Oct. 26, 2017, the entirety of which is incorporated by reference herein.

BACKGROUND OF THE INVENTION

Field of the Invention

The application relates in general to a portable electronic device, and in particular to a portable electronic device with multiple modes of use.

Description of the Related Art

Due to the popularity of tablet computers and touch display screens, users have become accustomed to operating electronic devices by touch. Some laptop computers are equipped with detachable touch display screens (tablets) and are switchable between a laptop (notebook) mode and a tablet mode via the connecting mechanism thereof to facilitate the operations of the user. However, although the connecting mechanisms of the laptops are suitable for this purpose, when the touch display screen (tablet) is connected to the connecting mechanism, the screen may still sway, or the connection strength between the screen and the connecting mechanism is insufficient.

BRIEF SUMMARY OF INVENTION

To address the deficiencies of conventional products, an embodiment of the invention provides a portable electronic device that primarily includes a display unit, an input unit, and a hinge member. The hinge member is detachably connected to the display unit and pivotally connected to the input unit. The hinge member and the display unit are rotatable relative to the input unit around a rotary axis. The display unit has at least a slot and the hinge member has at least a guide pin corresponding to the slot. The guide pin has a first slope structure and a vertical surface structure. The first slope structure and the vertical surface structure are arranged in a direction parallel to the rotary axis.

In some embodiments, the length of the first slope structure in the direction of the rotary axis is less than or equal to one half of the length of the guide pin in the direction of the rotary axis.

In some embodiments, the length of the first slope structure in the direction of the rotary axis is less than or equal to one-third of the length of the guide pin in the direction of the rotary axis.

In some embodiments, the portable electronic device further comprises at least a connecting assembly movably disposed in the slot and abutting against the first slope structure.

In some embodiments, the connecting assembly includes a sliding member and a spring, wherein the spring is disposed around the sliding member.

In some embodiments, the sliding member has a main body and a rod portion, wherein the spring is disposed around the rod portion and the main body has a second slope structure in contact with first slope structure.

In some embodiments, the slot has a first portion corresponding to the vertical surface structure, and the first portion is configured to receive the vertical surface structure.

In some embodiments, the slot further has a second portion corresponding to the first slope structure, and the connecting assembly is disposed in the second portion of the slot.

In some embodiments, the depth of the second portion is greater than the first portion.

In some embodiments, the input unit has at least a protrusion and the hinge member further has at least a recess configured to receive the protrusion.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the portable electronic devices are discussed in detail below. The embodiments of the present invention will be described with reference to the drawings. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise. In addition, directional terms such as up, down, left, right, front, back and the like mentioned in the following embodiments are only directions with reference to the attached drawings. The directional terms used are intended to illustrate and not to limit the present invention.

Figure 1:
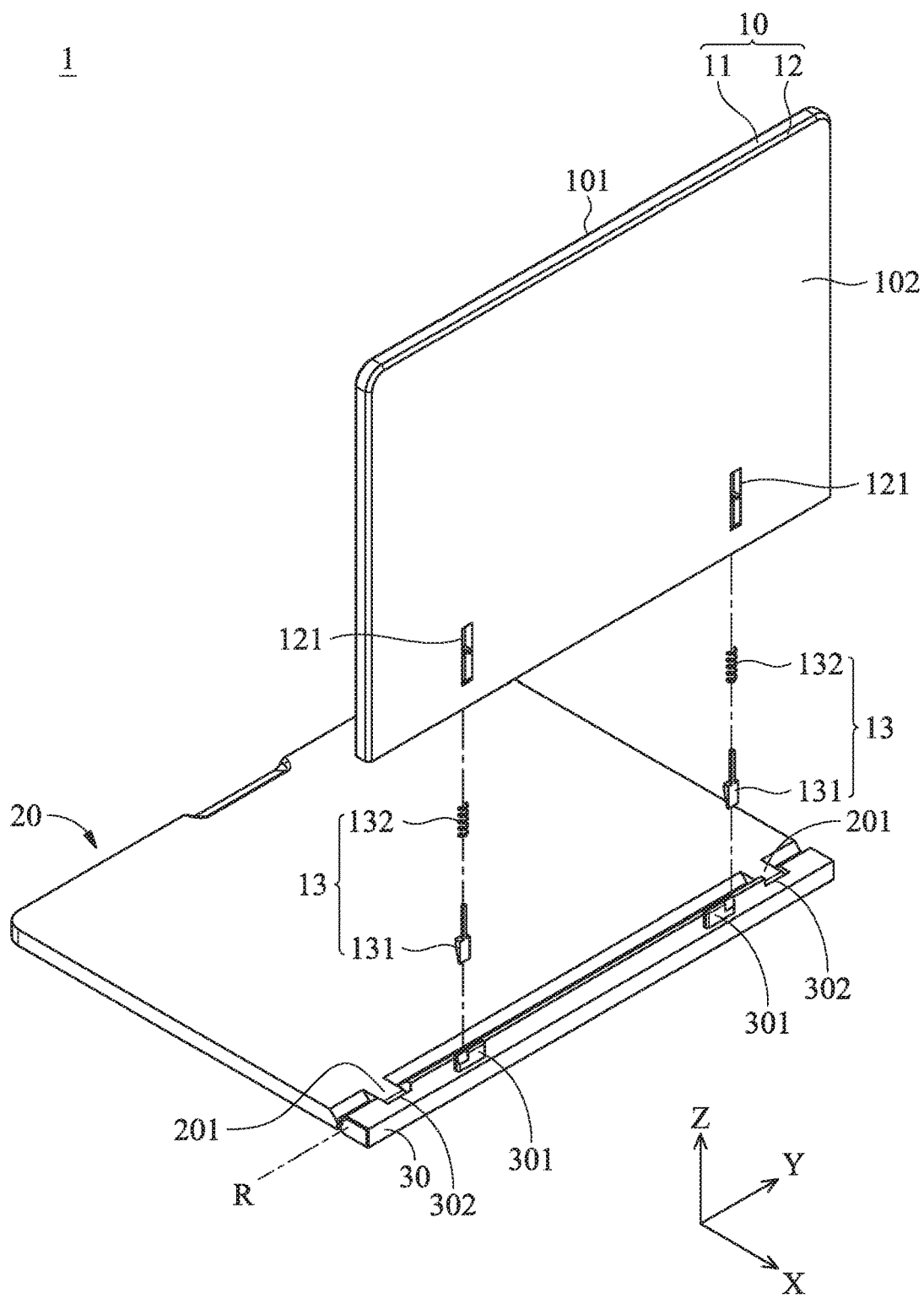
FIG. 1 is an exploded diagram of a portable electronic device according to an embodiment of the invention.
Figure 3:
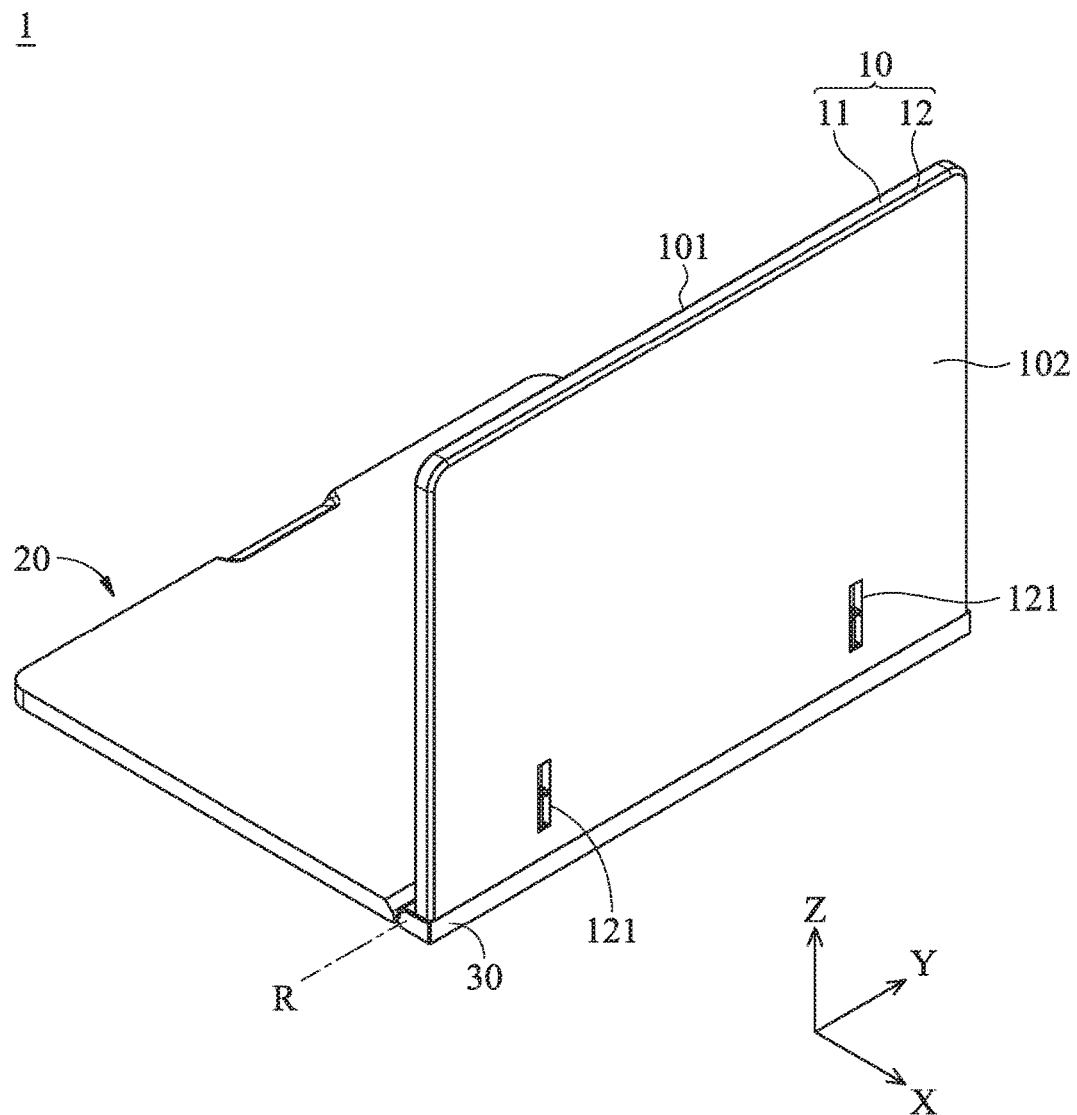
FIG. 3 is a schematic diagram of the portable electronic device in FIG. 1 after assembly.

Referring to FIG. 1, a portable electronic device 1 is provided according to an embodiment of the present invention. The portable electronic device 1, for example, may be a laptop computer, primarily comprises a display unit 10, an input unit 20, and a hinge member 30. The display unit 10 may has a flat structure and configured to displaying images. In some embodiments, the display unit 10 may be a touch display. The display unit 10 includes a display panel 11 and a frame body 12 which are connected each other. The display unit has a front side 101 and a rear side 102, wherein the display panel 11 is located on the front side 101 and the frame body 12 is located on the rear side 102, wherein the rear side 102 is opposite to the front side 101. In the present embodiment, the display unit 10 may be a tablet, and the display panel 11 thereof may be a touch display panel and is cable of showing images or texts on the front side 101. As shown in FIGS. 1 and 3, the frame body 12 has at least a slot 121, and the slot 121 and the guide pin 301 of the hinge member 30 are detachably connected.

The input unit 20 may be a flat structure, and the surface thereof may be equipped with a keyboard or a touch panel (not shown). The inside of the input unit 20 may further include different electronic components (not shown) such as a CPU, a memory or an input unit board. As shown in FIG. 1, the input unit 20 has at least a protrusion 201 configured to be pivotally connected to the hinge member 30. In some embodiments, various electronic components such as a CPU, a memory, and an input unit board may also be disposed inside the display unit 10.

The hinge member 20 has at least a guide pin 301 and at least a recess 302. In the present embodiment, the hinge member 30 has two guide pins 301 respectively corresponding to the two slots 121 of the frame body 12. In addition, the hinge member 30 further has two recesses 302 configured to receive the two protrusions 201 of the input unit 20, respectively.

Please continue refer to FIG. 1, the portable electronic device 1 further comprises at least a connecting assembly 13. In the present embodiment, the portable electronic device 1 comprises two connecting assemblies 13 which are received in the two slots 121 of the frame body 12, respectively. Particularly, the connecting assembly 13 includes a sliding member 131 and a spring 132. The spring 132 is disposed around (or envelops) the sliding member 131.

Referring to FIG. 3, which is a schematic diagram of the portable electronic device 1 in FIG. 1 after assembly. The display unit 10 is connected to the guide pin 301 of the hinge member 30 via the slot 121 and the connecting assembly 13. Therefore, by the hinge member 30, the display unit 10 is can be rotated relative to the input unit 20 around a rotary axis R, and the display unit 10 can be detachably connected the hinge member 30 so that the usage mode of the portable electronic device 1 can be switched, such as the notebook mode or the tablet mode, according to the user's requirements.

Figure 2A:
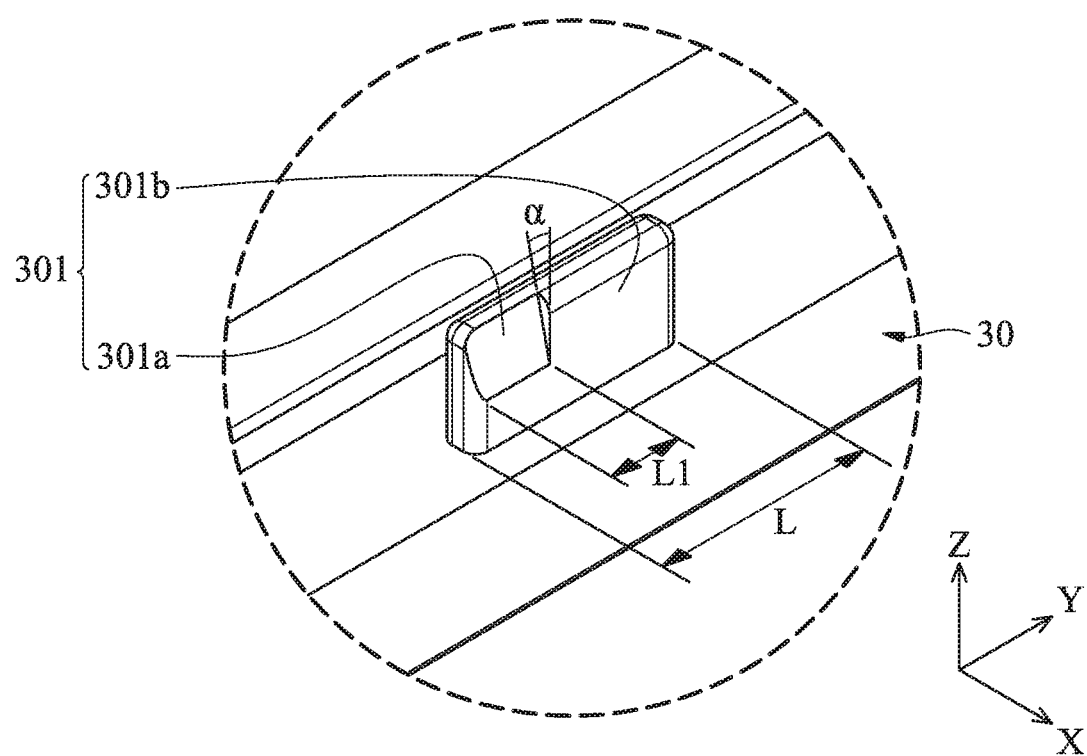
FIG. 2A is an enlarged view diagram of the guide pin in FIG. 1.

Next, please refer to FIG. 2A, which is an enlarged view of the guide pin 301 in FIG. 1. As can be seen from FIG. 2A, the guide pin 301 has a first slope structure 301a and a vertical surface structure 301b. The first slope structure 301a and the vertical surface structure 301b are arranged in a direction that is parallel to the rotary axis R (Y-axis direction). In particular, an acute angle α is between the first slope structure 301a and the vertical surface structure 301b, and the length L1 of the first slope structure 301a in the Y-axis direction is less than or equal to half of the length L of the guide pin 301 in the Y-axis direction. In some embodiments, the ratio of the length L1 of the first slope structure 301a to the length L of the guide pin 301 is greater than 0 (zero) and less than or equal to ⅓ (one-third). By using the aforementioned structural design, the structural strength of the guide pin 301 can be maintained even when the display unit 10 and the hinge member 30 are assembled.

Figure 2B:
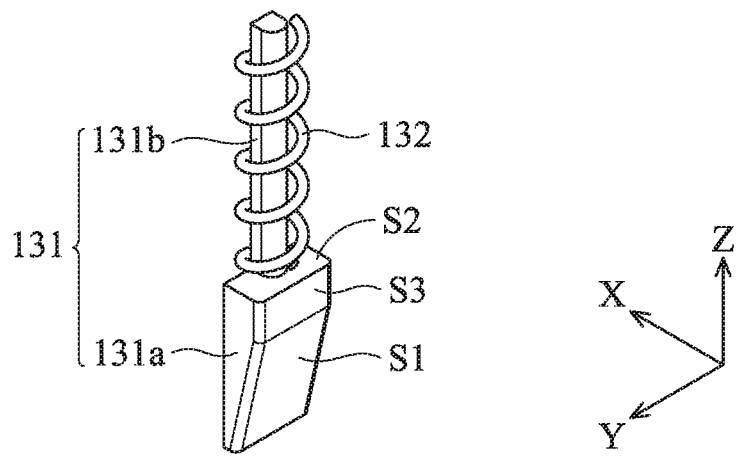
FIG. 2B is a schematic diagram of the connecting assembly in FIG. 1 after assembly.

Please refer to FIG. 2B, which is a schematic perspective view of the connecting assembly 13 of FIG. 1 after assembled. As shown in FIG. 2B, the sliding member 131 has a main body 131a and a rod portion 131b. The spring 132 is disposed around the rod portion 131b. The main body 131a has a second slope structure S1. When the display unit 10 and the hinge member 30 assemble, the second slope structure S1 is in contact with the first slope structure 301a. That is, the first slope structure 301a and the second slope structure S1 have substantially the same degree of slope with respect to the vertical direction (Z-axis direction). In addition, the main body 131a further has a top surface structure S2 and a connecting surface structure S3. The top surface structure S2 is connected to the rod portion 131b, and the connecting surface structure S3 connects the second slope structure S1 and the top surface structure S2. By this structural design, the assembly positioning can be enhanced and the position of the sliding member 131 can be adjusted by the elastic force produced from the spring 132, to ensure that the first slope structure 301a and the second slope structure S1 can be in close contact when they are combined, thereby the situation of the connection gap being too large can be avoided.

Figure 4A:
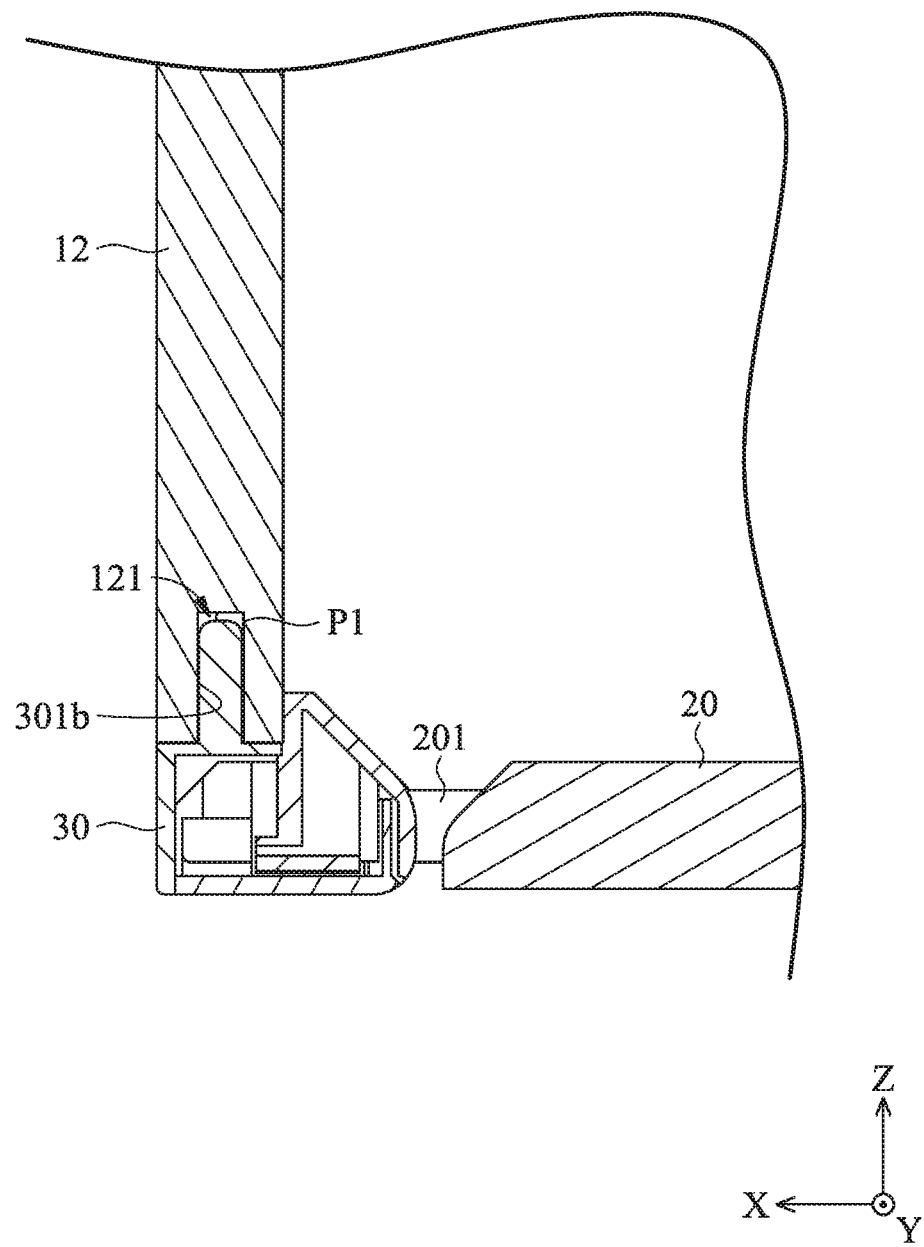
FIG. 4A is a cross-sectional view diagram of the slot and the vertical surface structure in FIG. 3 after assembly.

Please refer to FIG. 4A. FIG. 4A is a schematic cross-sectional view of the slot 121 and the vertical surface structure 301b in FIG. 3. The slot 121 of the frame body 12 has a first portion P1 corresponding to the vertical surface structure 301b of the guide pin 301, and the first portion P1 can receive the vertical surface structure 301b.

Figure 4B:
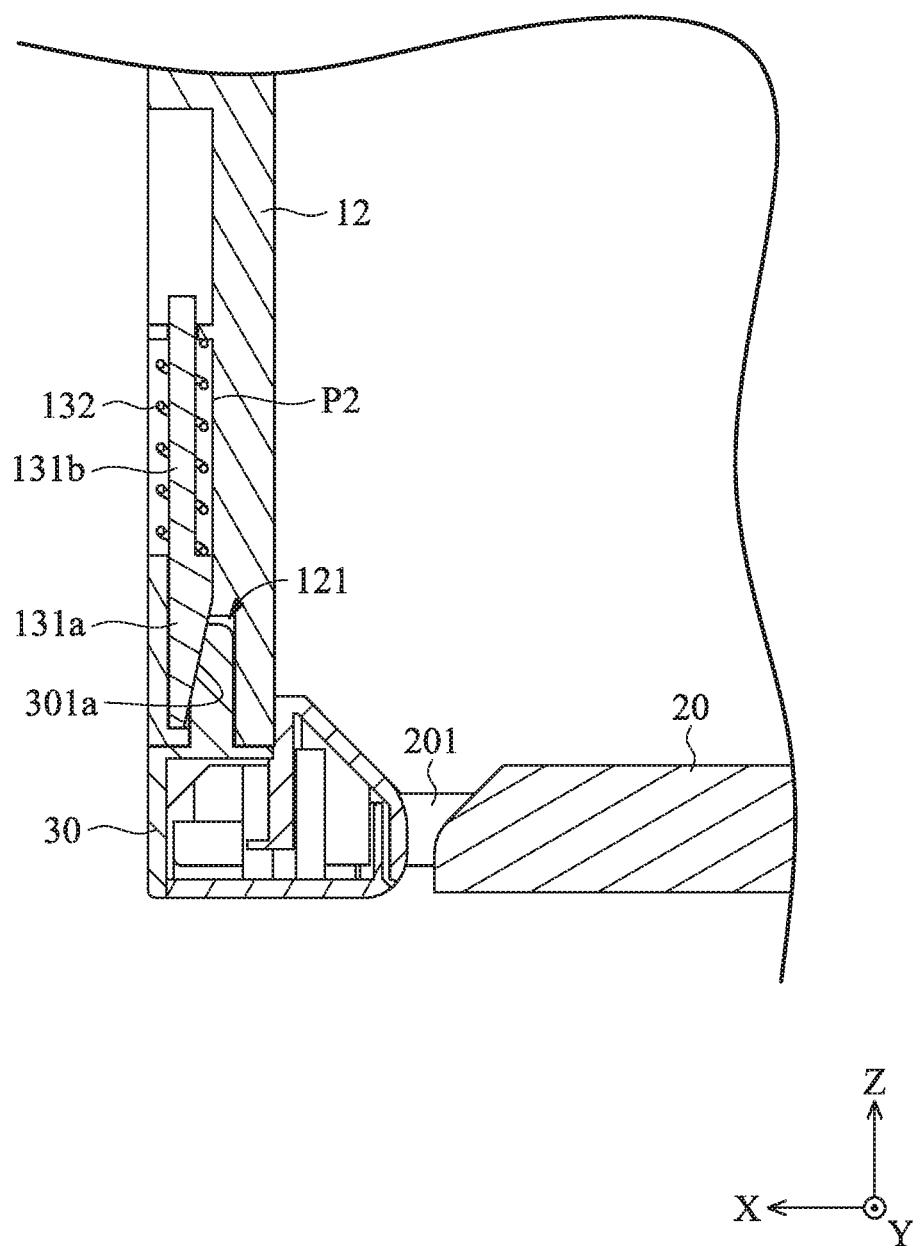
FIG. 4B is a cross-sectional view diagram of the slot, the connecting assembly and the first slope structure in FIG. 3 after assembly.

Please refer to FIG. 4B, which is a schematic cross-sectional view of the slot 121, the connecting assembly 13 and the first slope structure 301a in FIG. 3. The slot 121 of the frame body 12 has a second portion P2 corresponding to the first slope structure 301a of the guide pin 301, wherein the connecting assembly 13 is disposed in the second portion P2, and the sliding member 131 is slidable within the second portion P2. The first portion P1 and the second portion P2 of the slot 121 are communicated with each other, and they are arranged along the direction that is parallel rotary axis R (Y-axis direction), and the positions of the first portion P1 and the second portion P2 respectively correspond to the vertical surface structure 301b and the first inclined surface structure 301a. Furthermore, for receiving the connecting assembly 13, the depth of the second portion P2 in the vertical direction (Z-axis direction) is greater than the depth of the first portion P1 in the vertical direction (Z-axis direction).

In the portable electronic device of the above embodiment of the present invention, the sliding member 131 is disposed on the display unit 10 and a corresponding first slope structure 301a is formed on the guide pin 301 of the hinge member 30, so that the problem, the touch display screen is easily shaken or the connection strength is insufficient when the screen is connected with the connecting mechanism, can be effectively solved. In addition, using the portable electronic device of the above embodiments of the present invention can improve the positioning effect of the assembly and an excessive connection gap between the display unit and the hinge member can be avoided.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A portable electronic device, comprising:
a display unit, having at least a slot;
an input unit;
a hinge member, detachably connected to the display unit and pivotally connected to the input unit, and the hinge member and the display unit are rotatable relative to the input unit around a rotary axis, wherein the hinge member has at least a guide pin corresponding to the slot, and the guide pin has a first slope structure and a vertical surface structure, wherein the first slope structure and the vertical surface structure are arranged in a direction parallel to the rotary axis; and
a connecting assembly having an elongated structure along a direction that is perpendicular to the rotating axis, movably disposed in the slot and connected to the guide pin and the display unit, wherein the guide pin is between the connecting assembly and a casing of the display unit;
wherein the connecting assembly has a second slope structure toward a display surface of the display unit to abut against the first slope structure;
wherein the length of the first slope structure in the direction of the rotary axis is less than or equal to one half of the length of the guide pin in the direction of the rotary axis.

2. The portable electronic device as claimed in claim 1, wherein the length of the first slope structure in the direction of the rotary axis is less than or equal to one-third of the length of the guide pin in the direction of the rotary axis.

3. The portable electronic device as claimed in claim 1, wherein the slot has a first portion corresponding to the vertical surface structure, and the first portion is configured to receive the vertical surface structure.

4. The portable electronic device as claimed in claim 3, wherein the slot further has a second portion corresponding to the first slope structure, and the connecting assembly is disposed in the second portion of the slot.

5. The portable electronic device as claimed in claim 4, wherein the depth of the second portion is greater than that of the first portion.

6. The portable electronic device as claimed in claim 1, wherein the input unit has at least a protrusion and the hinge member further has at least a recess configured to receive the protrusion.

7. A portable electronic device, comprising:
a display unit, having at least a slot;
an input unit;
a hinge member, detachably connected to the display unit and pivotally connected to the input unit, and the hinge member and the display unit are rotatable relative to the input unit around a rotary axis, wherein the hinge member has at least a guide pin corresponding to the slot, and the guide pin has a first slope structure and a vertical surface structure, wherein the first slope structure and the vertical surface structure are arranged in a direction parallel to the rotary axis; and
a connecting assembly having an elongated structure along a direction that is perpendicular to the rotating axis, movably disposed in the slot and connected to the guide pin and the display unit, wherein the guide pin is between the connecting assembly and a casing of the display unit;
wherein the connecting assembly has a second slope structure toward a display surface of the display unit to abut against the first slope structure;
wherein the connecting assembly includes a sliding member and a spring, and the spring is surrounds the sliding member.

8. The portable electronic device as claimed in claim 7, wherein the sliding member has a main body and a rod portion, the spring is disposed around the rod portion, and the main body has a second slope structure in contact with first slope structure.

* * * * *